March 21, 1967
M. BEINTUM ETAL
3,310,344
VEHICLE MUD FLAP CONSTRUCTION
Filed June 16, 1965
3 Sheets-Sheet 1
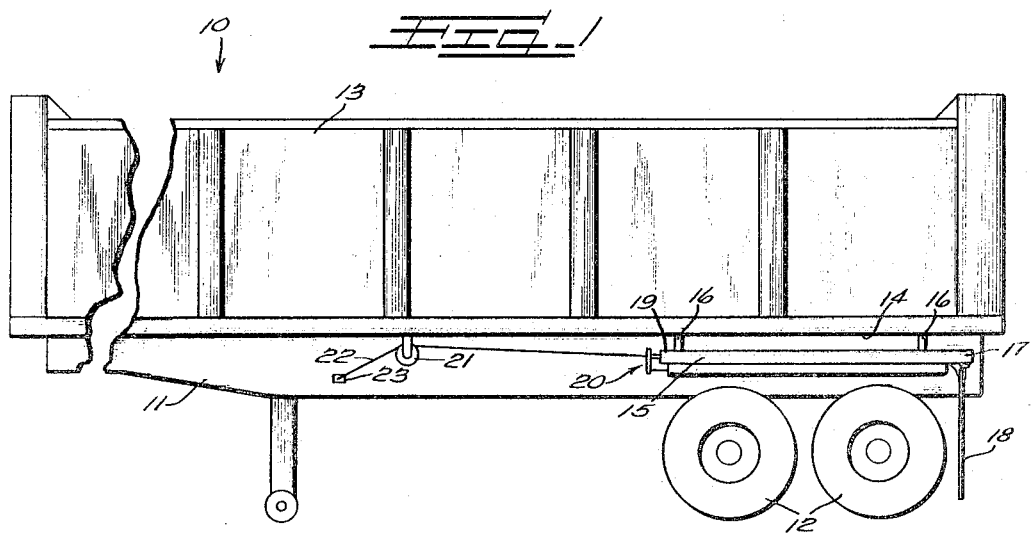
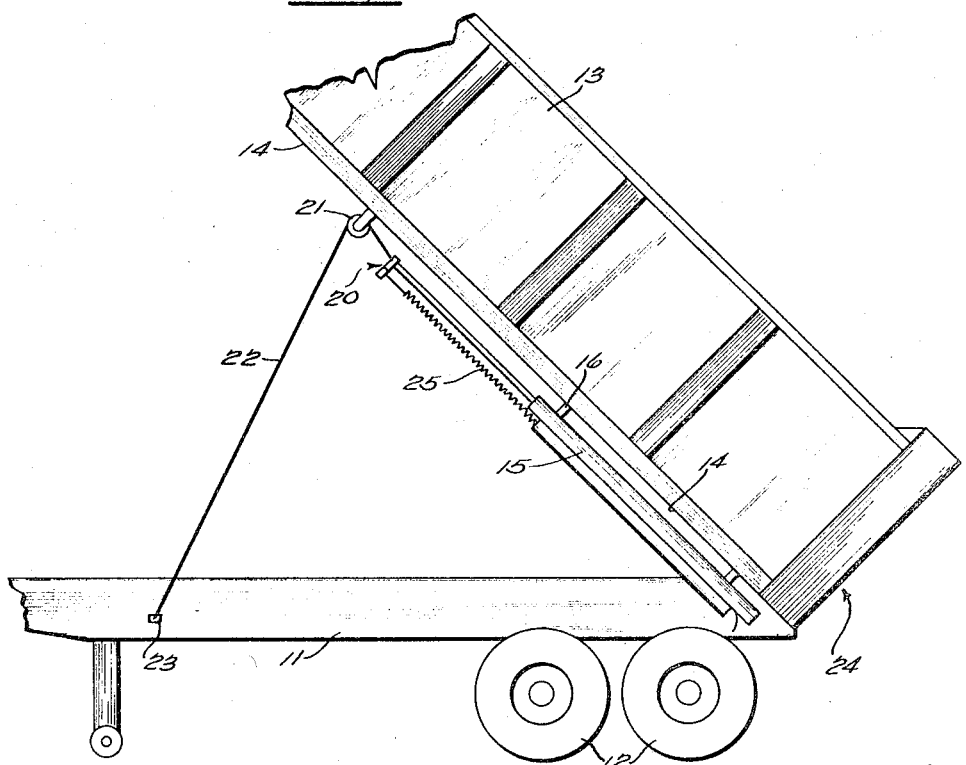
INVENTORS
MENZO BEINTUM
ROBERT BEINTUM
ATTORNEYS

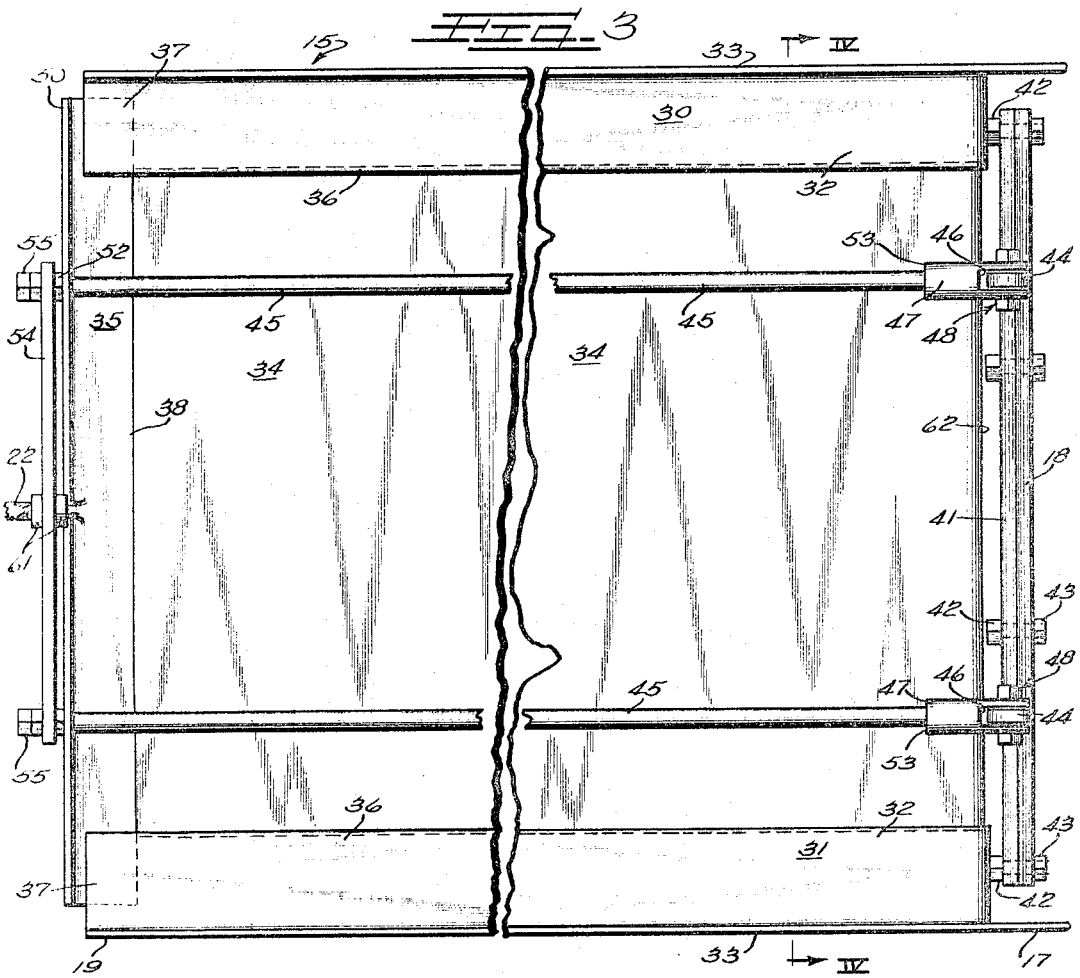
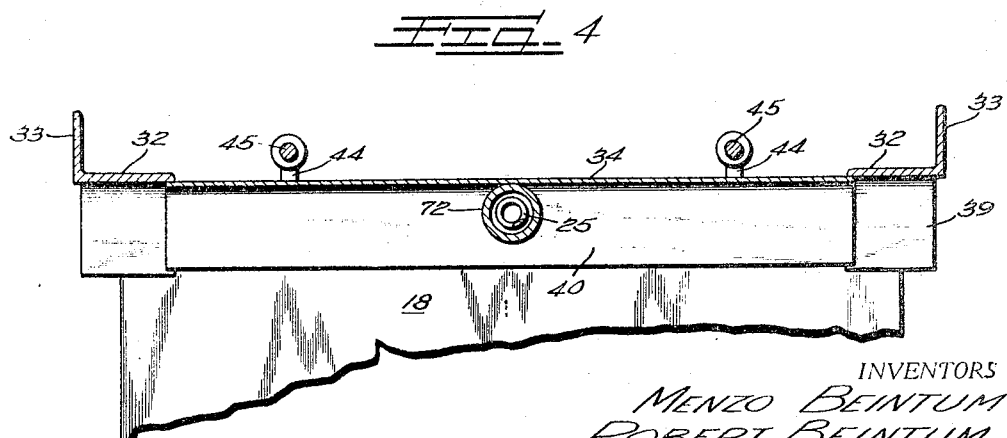

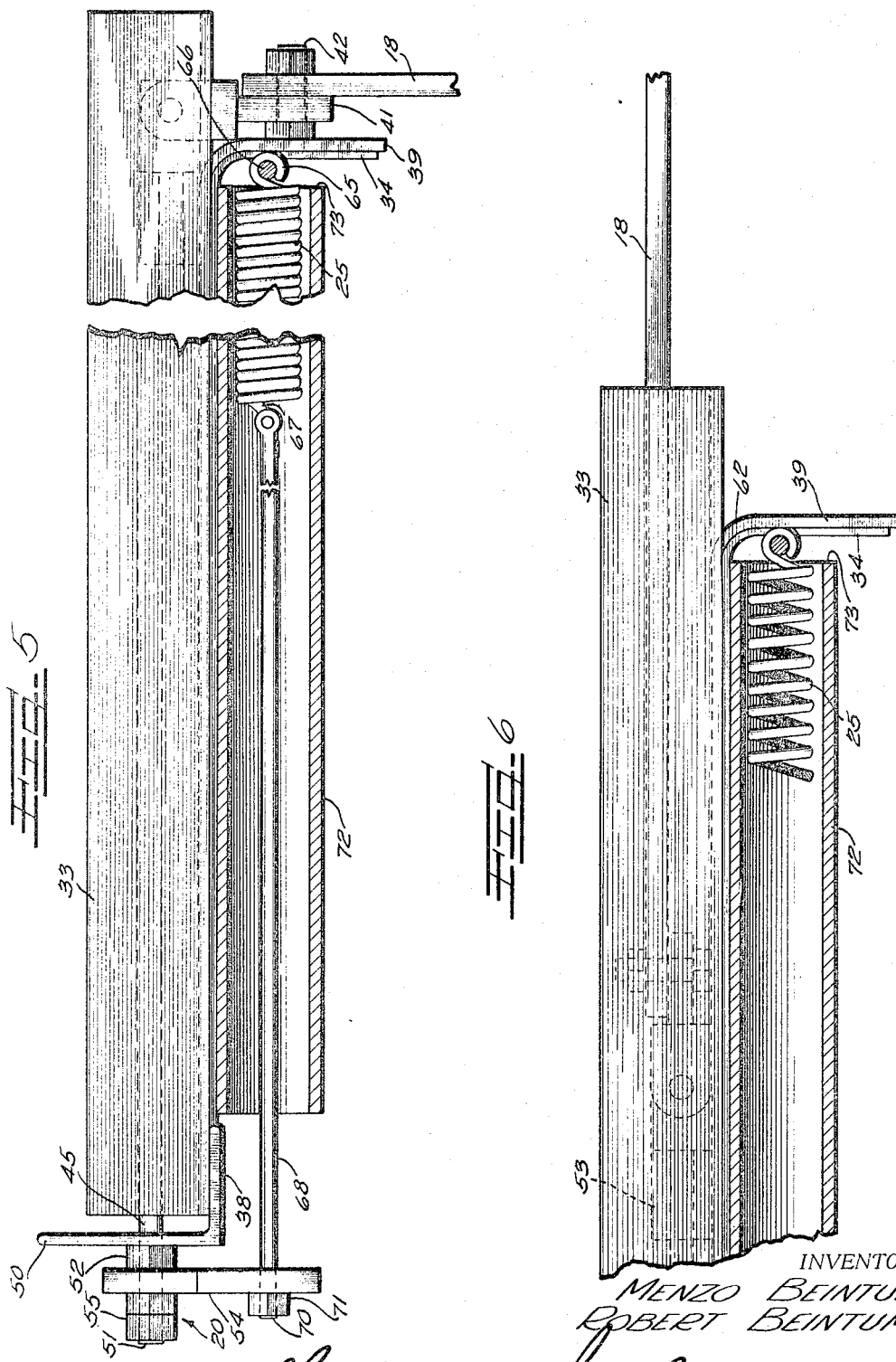

United States Patent Office 3,310,344
Patented Mar. 21, 1967

3,310,344
VEHICLE MUD FLAP CONSTRUCTION
Menzo Beintum, 6755 W. 91st Place, Oak Lawn, Ill. 60453, and Robert Beintum, 3708 W. 120th Place, Alsip, Ill. 60658
Filed June 16, 1965, Ser. No. 464,479
1 Claim. (Cl. 298—1)

This invention relates to mud guards for vehicles and more particularly to a retractable mud flap guard for dumping vehicles.

There has been in use for some time on large vehicles, such as trucks, flaps mounted to the truck frame behind the rear wheels to act as a guard against the projection of mud, stones, etc., from the wheels to trailing vehicles. While such flaps or mud guards are readily mounted and maintained on fixed bed vehicles, serious problems have developed with their use on raised bed or dumping-type vehicles.

For instance, when the load-carrying bed of such vehicles is raised and the load is released, the flaps have a tendency to be piled upon by the load which quite often results in the flaps being pulled off from their mountings and lost beneath the load. This is quite costly and time-consuming in loss of materials, repair costs, and possible traffic violations.

It is therefore an object of the present invention to prevent the mutilation and loss of mud guards on dumping vehicles.

It is also an object to provide a retractable mud flap guard for vehicles.

Another object is to provide a mud guard for dumping vehicles which retracts smoothly from the load-dumping area without rolling or otherwise mutilating the mud guard.

A further object of this invention is to provide a mud guard on a pivotal bed type of dumping vehicle which retracts simultaneously with lifting of the pivotal bed during load-dumping operations.

Other objects and advantages of this invention and a fuller understanding of the nature thereof may be had by referring to the claims and to the following detailed description taken in conjunction with the accompanying drawings.

FIGURE 1 is an elevational view of a load-carrying pivotal bed dumping type of vehicle within which the invention is incorporated.

FIGURE 2 is a fragmentary elevational view illustrating retraction of the mud guard according to the principles of the present invention.

FIGURE 3 is a fragmented plan view illustrating the retractable mud guard assembly constructed in accordance with the principles of the present invention.

FIGURE 4 is a sectional elevational view taken along the lines IV—IV of FIGURE 3.

FIGURE 5 is a fragmented elevational view illustrating a portion of the mud flap and the mechanism associated therewith for retracting the flap.

FIGURE 6 is a fragmented elevational view illustrating the flap as it is being retracted.

According to the present invention and as will be described in more detail a housing is mounted to the vehicle frame, with a flap retractably mounted therein so as to hang in proper mud guard position and to be retracted when desired.

In FIGURE 1 there is shown a dumping-type vehicle 10 within which for illustration purposes the retractable mud guard assembly constructed according to the present invention has been incorporated. The dumping vehicle 10 is of the type having a lower frame 11 including rear wheels 12 rotatably mounted thereto, and an upper load-carrying bed 13 pivotally mounted at one end of the frame 11 and being driven (by means not shown) so that raising or pivoting of the bed 13 in a manner illustrated in FIGURE 2 provides the dumping of the load carried therein.

Under the bottom 14 of the pivotal bed 13 and over the rear wheels 12 there is mounted a housing 15 supported by conventional means such as hangers 16 welded both to the housing 15 and to the bottom 14. At an end 17 of the housing 15 a mud flap 18 is pivotally hung from within the housing 15 so as to lie directly behind the rear wheels 12 to act as a mud guard in the well-known manner of these devices. Protruding from the opposite housing end 19 a coupling member 20 is operatively engaged within the housing 15 to the mud flap 18, in such a manner that as the coupling member 20 is extended out from the housing 15 the mud flap 18 is flipped to a horizontal position and retracted in one smooth operation within the housing.

In the dumping vehicle configuration shown in FIGURES 1 and 2 the coupling member 20 is extended from the housing 15 by a cable and pulley as the bed 13 is raised. In particular, and referring to FIGURE 2 a pulley 21 is mounted to the bottom 14 at approximately the center of the bed 13. A cable 22 has one end securely anchored to lower frame 11 at 23 and another end securely connected to the coupling member 20.

In FIGURE 1 with the load-carrying bed 13 in a down position atop the lower frame 11, the mud flap 18 depends downwardly from the housing 15 immediately adjacent and behind the rear wheels 12. When the bed 13 is pivoted to a raised position shown in FIGURE 2 to dump the load carried therein, the pulley 21 rides along the cable 22 and exerts an extending force on coupling member 20 to retract the mud flap 18 within the housing 15 and out of the dumping area below the dumping end 24 of the bed 13. To assist the mud flap 18 in returning to its proper position a spring 25 is mounted below the housing 15 and connected to one end of the coupling member 20 so that raising of the bed 13 expands the spring, with subsequent contraction of the spring returning the coupling member 20 to a position substantially within the housing 15 as the bed 13 is lowered. Instead of providing two separate housings 15, one for each set of wheels 12 on each side of the frame 11, a single housing may be employed with separate flaps 18 retracted by a single coupling member 20 or separate couplings.

The remaining FIGURES 3–6 show in more detail the mud guard assembly and in particular the construction of housing 15, mud flap 18, coupling member 20, and the various interconnections therebetween which retractable mud guard is also useful on and readily adapted to other vehicles besides those of the dumping type.

In the plan view of FIGURE 3 a pair of generally L-shaped side brackets 30 and 31 each has a flat rider portion 32 and a side rail 33, the side brackets 30 and 31 being rigidly interconnected by a floor plate 34 and a back coupling member support bracket 35. This rigid interconnection between the brackets 30 and 31, the floor plate 34 and the bracket 35 is accomplished by welding a pair of edges 36 of the brackets 30 and 31 to overlying portions of the plate 34 and by similarly welding ends 37 to an overlying flat horizontal portion 38 of the bracket 35.

At one end of the housing 15, the top flat rider portion 32 of each of the brackets 30 and 31 has a depending rider portion 39 formed transversely to the flat portions 32. Similarly the floor plate 34 ends in a depending plate 40 which is welded to and rigidifies the depending rider portions 39 as is illustrated in FIGURE 4.

At housing end 17 of the housing 15 the mud flap 18 is rigidly attached to a support bar 41 by means of a number of bolts 42 which pass through the support bar 41 and the flap 18 and are threadably engaged by corresponding nuts 43 to secure the flap 18 in position. It may be noted that the support bar 41 has a pair of ears 44 which may be integral with the support bar 41 or may be separate pieces welded thereto.

Pivotally engaging each of the ears 44 is a rod 45 having a swivel slot 46 formed in an end cap 47. Each of the ears 44 is inserted into the swivel slot 46 and is pivotally attached to the corresponding one of the rods 45 by a nut and bolt arrangement 48, the bolt passing through an oversize aperture in each of the ears 44 so that the flap 18 may pivot with respect to the rods 45.

At the housing end 19 the rods 45 are supported by extending through apertures in a backrail 50 of the bracket 35, each of the rods 45 having a threaded end 51 with the nuts 52 threaded thereon into abutting relation with the backrail 50 to form a stop and prevent the rods 45 from moving further to the right as shown in FIGURE 5. Similar bumper or stopping surfaces 53 are formed on the end caps 47 to butt against the backrail 50 so as to prevent further movement of the rods 45 in their extended position out of the housing 15.

Interconnection of the rods 45 is accomplished by a plate 54 having apertures positioned corresponding to the rods 45 and connected to the threaded rod ends 51 by locking nuts 55. At approximately the center of the plate 54 the cable 22 is rigidly attached thereto by the clamp 61.

With the dumping vehicle 10 in the position shown in FIGURE 1, the mud flap 18 is held depending from the housing 15 as shown in FIGURE 5 with the coupling member 20 in the position as shown therein. In particular, it may be noted that the two end bolts 42 which assist in holding the mud flap 18 to the support bar 41 rest against the depending rider portions 39 of each of the brackets 30 and 31 to properly position the flap 18 depending from the housing 15. As the pivotal bed 13 commences to rise to the position shown in FIGURE 2, the pulley 21 rotates on the cable 22 which via the plate 54 exerts an extending force on the rods 45 to urge the rods outward from the housing 15. As the rods 45 begin to move outwardly from the housing 15, the bolt 42 rides up and over the smooth radial corner 62 formed between the depending rider portions 39 and the top flat rider portions 32 of each of the brackets 30 and 31. This operation flips the mud flap 18 into a horizontal position as shown in FIGURE 6 with the flap 18 supported by the bolts 42 now resting on the top flat rider portions 32 of the brackets 30 and 31. Continued movement of the bed 13 to the final raised position for dumping the load as shown in FIGURE 2, enables the flap 18 to be smoothly retracted without rolling or mutilating the flap, into the housing 15 with the bumper edges 53 providing a stop against the backrail 50. Instead of using the herein described mechanical lift, the mud guard assembly of the present invention can also be operated by electric, hydraulic or air units.

To enable the flap 18 to move into its depending position as shown in FIGURE 1 when the bed 13 is lowered to its down position on the lower frame 11, there is provided a coil spring 25 which has one end 65 looped around a short bar 66 and another spring end 67 rigidly connected to a coupling rod 68 which interconnects the plate 54 with the spring 25. The threaded end 70 of the rod 68 passes through an aperture in the plate 54 and is rigidly attached thereto by the nut 71.

The rod 68 and the spring 25 are mounted within a tube 72 which extends the length of the housing 15 from one end 17 to the other end 19 and is welded to the underside of floor plate 34 as illustrated in FIGURE 4. The tube 72 not only houses the rod 68 and the spring 25 but by welding the short bar 66 to the tube end 73 also provides a fixed mounting for the spring end 65. Thus, as the raised bed 13 is returned from its raised position shown in FIGURE 2 to the lowered position shown in FIGURE 1, the previously expanded spring 25 acting through the coupling rod 68 exerts a return force on coupling member 20 via the plate 54 to send the flap 18 rightwardly as viewed in FIGURE 6 along the top flat rider portion 32 downwardly over the smooth radial corner 62 to rest against the depending rider portion 39 and depend from the housing 15 in a manner shown in FIGURE 1. The nuts 52 act as stops in this operation and to adjust the position of the flap 18.

Although the drawings and specification present a detailed disclosure of a preferred embodiment of the present invention, it is to be understood that the invention is not limited to the specific forms disclosed, and covers all modifications, changes and alternative constructions falling within the scope of the principles taught by the invention.

We claim as our invention:

In a dumping vehicle having a frame and a load-carrying bed pivotable from a lowered position to a raised load-dumping position,
 a housing rigidly mounted beneath said bed including a first rider portion and a second rider portion transverse thereto,
 a rod approximately equal in length to said housing and slidably mounted therein, means rigidly mounted on said housing for guiding the forward end of said rod, a flap pivotally connected to the rearward end of said rod and depending downwardly from said housing along said second rider portion with said bed in its lowered position,
 a cable having one end anchored to said frame and another end secured to said rod,
 pulley means mounted to said bed and engaging said cable to retract said flap within said housing along the first rider portion as said bed is raised to the load-dumping position,
 spring means including a spring with a first end rigidly mounted to said frame and a second end connected to the forward end of said rod, said spring means expanding with the raising of said pivotable bed and contracting with the lowering of said bed onto said frame so as to urge said flap into said depending downward position said housing having means enclosing said spring when the bed is in its lowered position.

References Cited by the Examiner
UNITED STATES PATENTS

| | | | |
|---|---|---|---|
| 1,804,677 | 5/1931 | Davis | 49—379 X |
| 2,721,760 | 10/1955 | Lapham | 298—1 |
| 2,857,200 | 10/1958 | Hoppesch | 298—1 |
| 2,981,553 | 4/1961 | Zerbe | 280—154.5 |
| 3,165,360 | 1/1965 | Saxton | 298—1 |
| 3,203,710 | 8/1965 | Harting | 280—154.5 |
| 3,248,126 | 4/1966 | Saxton | 280—154.5 |

BENJAMIN HERSH, *Primary Examiner.*

RICHARD J. JOHNSON, *Examiner.*